United States Patent [19]
Prichard et al.

[11] 3,910,877
[45] Oct. 7, 1975

[54] BIS(CYANOPHENYL)-3-FORMAZANCARBONITRILE COMPOUNDS

[75] Inventors: William W. Prichard, Hockessin; Francis Wilfred Stacey, Wilmington, both of Del.

[73] Assignee: E. I. Du Pont de Nemours and Company, Wilmington, Del.

[22] Filed: Dec. 19, 1973

[21] Appl. No.: 429,026

[52] U.S. Cl. ............... 260/193; 260/174; 260/176; 260/192; 424/226
[51] Int. Cl.² .................. C07C 107/00; A01N 9/20
[58] Field of Search ........... 260/192, 193, 174, 176; 424/226

[56]  References Cited
UNITED STATES PATENTS

| | | | |
|---|---|---|---|
| 3,541,107 | 11/1970 | Henderson | 260/192 X |
| 3,715,435 | 2/1973 | Harnish et al. | 424/226 |
| 3,786,131 | 1/1974 | Buchel et al. | 424/226 X |

*Primary Examiner*—Floyd D. Higel
*Assistant Examiner*—C. F. Warren

[57]  ABSTRACT 1,5-Diphenyl-3-formazancarbonitriles having cyano substituents in the meta or para positions, independently, of one or both phenyl moieties, are useful as insecticides. One such compound is 1,5-bis(4-cyanophenyl)-3-formazancarbonitrile.

2 Claims, No Drawings

BIS(CYANOPHENYL)-3-FORMAZANCARBONITRILE COMPOUNDS

BACKGROUND OF THE INVENTION

This invention relates to novel 1,5-diphenyl-3-formazancarbonitriles having cyano substituents in the meta or para positions, independently, of one or both phenyl moieties. The compounds are useful as insecticides.

Certain 1,5-diaryl-3-fromazancarbonitriles and their preparation have been generally disclosed by Nasileva and Ermakova, *Zh. Analit. Khim.*, 19, 1305 (1964), Nineham, *Chem. Reviews*, 55, 355–483 (1955), Shawali and El-Galil, *Tetrahedron*, 27, 4305–4316 (1971), and Henderson in U.S. Pat. No. 3,541,107. However, insecticidal properties, as found in the compounds of this invention, are not disclosed for the compounds disclosed by the prior art.

Insect control is an important factor in maintaining adequate and healthy crop growth, since insect infestation can totally destroy or severely diminish food supplies for both man and animal. Additionally, of course, maintenance of general public health is dependent on adequate insect control. Thus, there is a continuing need for new products having higher activity or better selectivity in controlling insect populations.

SUMMARY OF THE INVENTION

According to this invention, there are now provided novel compounds useful as insecticides. These compounds are represented by the following general formula (I)

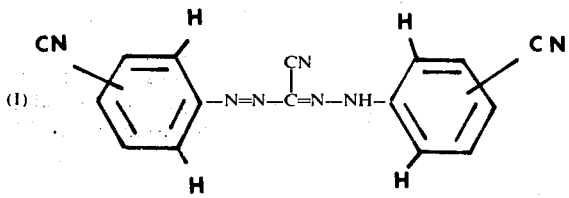

wherein each cyano substituent independently can be in the meta or para position of the respective phenyl moieties.

A preferred compound is 1,5-bis(4-cyanophenyl)-3-formazancarbonitrile, the compound wherein both cyano substituents are in the para position of the respective phenyl moieties.

DETAILED DESCRIPTION OF THE INVENTION

This invention is directed to certain substituted 1,5-diphenyl-3-formazancarbonitrile compounds and their use as insecticides.

In identifying these compounds, the nomenclature used throughout is based on one tautomer as expressed in the structures of Formula I, repeated as follows:

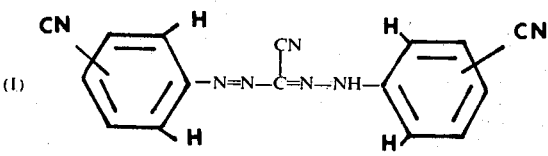

It is to be understood, however, that this nomenclature is intended to include the tautomers of Formulas Ia and Ib, as shown below, as well as mixtures of these tautomers and their cis and trans or syn and anti isomers.

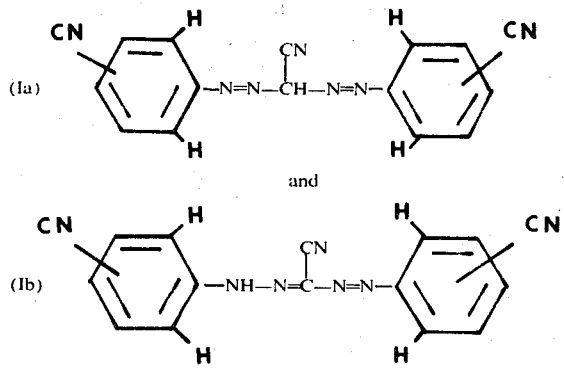

METHOD OF PREPARATION

The methods of preparation of 1,5-diphenyl-3-formazancarbonitriles are well known in the art. In general, the symmetrically substituted compounds are prepared by coupling of two moles of a diazonium salt with one mole of an active methylene compound having a cyano and a carboxy, carboalkoxy or carbonamido group. The first mole of diazonium salt couples at a pH of 4 to 6 to give the substituted phenylhydrozone of the corresponding cyano glyoxalic acid derivative.

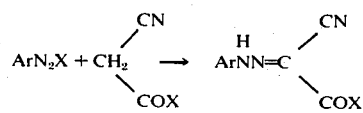

wherein X is OH, OR, or -NHR, and R is an alkyl of 1–4 carbon atoms.

The second mole of diazonium compound displaces the group COX at a pH of 7 to 8.5 to yield the corresponding formazancarbonitrile.

Unsymmetrical compounds are prepared by isolating the intermediate substituted phenylhydrazone of the above reaction and introducing a second diazonium salt having the desired substituent placement thereon.

The following example illustrates preparation of 1,5-bis(4-cyanophenyl)-3-formanzancarbonitrile. Cyanoacetic acid or its esters may be used in place of cyanoacetamide.

EXAMPLE I

A solution of 11.8 g (0.1 mole) p-cyanoaniline in 30 ml of 12N hydrochloric acid diluted with 300 ml of water is cooled to 0°by adding crushed ice until the volume of the solution is 500 ml. A solution of 7.0 g of sodium nitrite in 70 ml water is then added to the above with stirring. A solution of 4.2 g (0.05 mole) of cyanoacetamide in 50 ml water is added thereafter and the resulting mixture is poured into 450 ml of 1 molar $NaH_2PO_4$ buffer solution of pH 7.5, yielding a solid within the solution. The pH of the solution is then adjusted to 7.5 by adding 100 ml of a 10% sodium hydroxide solution, and carbon dioxide is evolved. Collection of the solid product is accomplished by filtration, the yield of crude product being quantitative. After recrystallization from acetone, the compound melted at 274°–275°C, and was identified as 1,5-bis(4-cyanophenyl)-3-formazancarbonitrile.

Useful formulations of the compounds can be prepared in conventional ways. They include dusts, granules, solutions, suspensions, emulsions, wettable powders, emulsifiable concentrates and the like. Many of these may be applied directly. Sprayable formulations can be extended in suitable media and used at spray volumes of from a few pints to several hundred gallons per acre. High strength compositions are primarily used as intermediates for further formulation. The formulations, broadly, contain about 1 to 99% by weight of active ingredient and at least one of (a) about 0.1 to 20% surfactant(s) and (b) about 5 to 99% solid or liquid diluent(s). More specifically, they will contain these ingredients in the following approximate proportions:

|  | Percent by Weight | | |
| --- | --- | --- | --- |
|  | Active Ingredient | Diluent(s) | Surfactant(s) |
| Wettable Powders | 20–90 | 0–74 | 1–10 |
| Oil Suspensions, Emulsions, Solutions (including Emulsifiable Concentrates) | 5–50 | 40–95 | 0–15 |
| Aqueous Suspensions | 10–50 | 40–84 | 1–20 |
| Dusts | 1–25 | 70–99 | 0–5 |
| Granules | 1–95 | 5–99 | 0–15 |
| High Strength Compositions | 90–99 | 0–10 | 0–2 |

Lower or higher levels of active ingredient can, of course, be present depending on the intended use and the physical properties of the compound. Higher ratios of surfactant to active ingredient are sometimes desirable, and are achieved by incorporation into the formulation or by tank mixing.

Typical solid diluents are described in Watkins, et al., "Handbook of Insecticide Dust Diluents and Carriers", 2nd. Edn., Dorland Books, Caldwell, N.J. The more absorptive diluents are preferred for wettable powders and the denser ones for dusts. Typical liquid diluents and solvents are described in Marsden, "Solvents Guide", end. Edn., *Interscience*, New York, 1950. Solubility under 0.1% is preferred for suspension concentrates; solution concentrates are preferably stable against phase separation at 0°C. "McCutcheon's Detergents and Emulsifiers Annual", Allured Publ. Corp., Ridgewood, N.J., as well as Sisely and Wood, "Encyclopedia of Surface Active Agents", Chemical Publ. Co., Inc., New York, 1964. list surfactants and recommended uses. All formulations can contain minor amounts of additives to reduce foam, caking, corrosion, microbiological growth, etc. Preferably, ingredients should be approved by the U.S. Environmental Protection Agency for the use intended.

The methods of making such compositions are well known. Solutions are prepared by simply mixing the ingredients. Fine solid compositions are made by blending and, usually, grinding as in a hammer or fluid energy mill. Suspensions are prepared by wet milling (see, for example, Littler, U.S. Pat. No. 3,060, 084). Granules may be made by spraying the active material upon preformed granular carriers or by agglomeration techniques, said techniques exemplified in J. E. Browning, "Agglomeration", *Chemical Engineering*, Dec. 4, 1967, pp. 147ff. and "Perry's Chemical Engineer's Handbook", 4th. Edn., McGraw-Hill, N.Y., 1963, pp. 8–59ff.

Further information regarding the art of formulation is found in U.S. Pat. Nos. 3,576,834, 3,560,616, and E. Somers, "Formulation", Chapter 6 in Torgeson, "Fungicides", Vol. I, Academic Press, New York, 1967.

The following examples illustrate preparation of compositions of this invention. In these examples, parts and precentages are by weight unless otherwise noted.

The chemical in the following examples is named as 1,5-bis(4-cyanophenyl)-3-formazancarbonitrile.

EXAMPLE II

Wettable Powder

| | |
| --- | --- |
| 1,5-bis(4-cyanophenyl)-3-formazancarbonitrile | 80% |
| sodium alkylnaphthalenesulfonate | 2% |
| SODIUM LIGNINSULFONATE | 2% |
| synthetic amorphous silica | 3% |
| kaolinite | 13% |

The ingredients are blended, coarsely hammer-milled and the air milled to produce particles of active that are 10 microns in diameter or less. The product is reblended before packaging.

EXAMPLE III

Granule

| | |
| --- | --- |
| wettable powder of Example I | 10% |
| attapulgite granules (U.S.S. No. 20–40; 0.84–0.42 mm) | 90% |

A slurry of wettable powder containing 50% solids is sprayed on the surface of attapulgite granules in a double-cone blender. The granules are dried and packaged.

EXAMPLE IV

Dust

| | |
| --- | --- |
| 1,5-bis(4-cyanophenyl)-3-formazancarbonitrile | 10% |
| attapulgite | 10% |
| talc | 80% |

The active ingredient is blended with attapulgite and passed through a hammer mill to produce particles less than 200 microns in diameter. The ground concentrate is then blended with powdered talc until homogeneous.

EXAMPLE V

Solution

| | |
| --- | --- |
| 1-5-bis(4-cyanophenyl)-3-formazancarbonitrile | 30% |
| dimethylformamide | 70% |

The ingredients are combined and stirred to produce a solution, which can be used for low volume applications.

EXAMPLE VI

Aqueous Suspension

| | |
|---|---|
| 1,5-bis(4-cyanophenyl)-3-formazan-carbonitrile | 50.0% |
| polyacrylic acid thickener | 0.3% |
| dodecylphenol polyethylene glycol ether | 0.5% |
| disodium phosphate | 1.0% |
| monosodium phosphate | 0.5% |
| polyvinyl alcohol | 1.0% |
| pentachlorophenol | 0.4% |
| water | 46.3% |

The ingredients are ground together in a sand mill to produce particles that are less than five microns in diameter.

EXAMPLE VII

High Strength Concentrate

| | |
|---|---|
| 1,5-bis(4-cyanophenyl)-3-formazan-carbonitrile | 89.5% |
| silica aerogel | 0.5% |
| synthetic amorphous fine silica | 1.0% |

The ingredients are blended and ground in a hammer mill to produce a high strength concentrate with all particles passing a U.S.S. No. 50 sieve (0.3 mm openings). This material may then be formulated in a variety of ways.

The compounds of this invention are useful for control of insects which are detrimental to agriculture and public health. They readily control pestiferous insects belonging to such orders as: lepidoptera, coleoptera, and diptera. More specifically, insects controlled by compounds of this invention include but are not limited to: mosquitoes (*Aedes aegypti* and *Culex pipiens*), southern armyworm (*Prodenia eridania*), bollworm (*Heliothis zea*), boll weevil (*Anthonomous grandis*), Mexican bean beetle (*Epilachna varivestis*), and house flies (*Musca domestica*).

The insects are controlled by applying the material in any convenient formulation to the locus of infestation, to the area to be protected, or to the insects themselves. For the control of insects in agricultural crops, one or more of the compounds are generally applied to the foliage or other plant parts which are infested or which are to be protected. Effective amounts to be applied depend upon the species to be controlled, its life stage, its size and location. The amount of rainfall, the time of year, moisture, type of application, formulation, and many other variables must also be considered. In general, for insect control in agriculture 0.1–5 kg/ha are sufficient, but one-fourth to 1½ kg/ha are preferred. When used on an area-wide base, as in the control of mosquito larvae, 1/50–5 kg/ha are generally sufficient, and 1/25–½ kg/ha are preferred. Pests of men and animals such as flies may be controlled by direct application or application to resting areas such as barn walls, etc. Where penetration of the insect cutical is needed for activity, addition of an adjuvant which acts as a penetrant may be beneficial.

The compounds of this invention can be mixed with fungicides, bactericides, acaracides, nematicides, insecticides, or other biologically active compounds in order to achieve desired results with a minimum expenditure of time, effort and material. Amounts of these biologically active materials may vary from 0.025 to 10 parts by weight. Suitable agents of this type are well known to those skilled in the art. Some are listed below:

Fungicides
  tetramethyl thiuram disulfide (thiuram)
  n-dodecylguanidine acetate (dodine)
  manganese ethylenebisdithiocarbamate (maneb)
  1,4-dichloro-2,5-dimethoxybenzene (chloroneb)
  methyl 1-(butylcarbamoyl)-2-benzimidazolecarbamate (benomyl)
  N-trichloromethylthiotetrahydrophthalimide (captan)
  N-trichloromethylthiophthalimide (folpet)
Bactericides
  tribasic copper sulfate
  streptomycin sulfate
Acaricides
  senecioic acid, ester with 2-sec-butyl-4,6-dinitrophenol ("Morocide")
  6-methyl-1,3-dithiolo[2,3-b]quinoxolin-2-one ("Moresten")
  ethyl 4,4'-dichlorobenzilate (Chorobenzilate)
  1,1-bis(p-chlorophenyl)-2,2,2-trichloroethane (Kelthane)
  bis(pentachloro-2,4-cyclopentadien-lyl) (Pentac)
Nematicides
  S-methyl 1-(dimethylcarbamoyl)-N-(methylcarbamoyloxy)-thioformimidate
  S-methyl 1-carbamoyl-N-(methylcarbamoyloxy) thioformimidate
  N-isopropylphosphoramidic acid, 0-ethyl-0'-[4-(methylthio)-m-tolyl]diester ("Nemacur")
Insecticides
  methyl carbamic acid, ester with oxime of 2-methyl-2-methylthiolpropionaldehyde (Temik)
  3-hydroxy-N-methylcrotonamide (dimethylphosphate) ester Azodrin)
  methyl carbamic acid, ester with 2,3-dihydro-2,2-dimethyl-7-benzofuranol (Furadan)
  0-[2,4,5-trichloro-α-(chloromethyl)benzyl]phosphoric acid, 0', 0'-dimethyl ester (Gardons)
  2-mercaptosuccinic acid, diethyl ester, S-ester with thionophosphoric acid, dimethyl ester (Melathion)
  phosphorothioic acid, 0,0-dimethyl, 0-p-nitrophenyl ester (methyl parathion)
  methyl carbamic acid, ester with α-napthol (Sevin)
  methyl 0-(methylcarbamoyl) thiolacetohydroxamate (methomyl)

EXAMPLE A

Bean plants in the two-leaf stage were sprayed to runoff with formulations of the indicated compounds. These formulations were made by dissolving 50 mg of compound in 10 ml acetone, adding 1 ml of 1% Methocel 15 and diluting to volume with Duponol -water at 1:3000. One hour after sraying, leaves were detached and placed singly in covered Petri dishes with 10 southern armyworm larvae. Evaluations with respect to % kill and % feeding were made 1 and 2 days later.

Control of Southern Armyworm Larvae with Compounds of the Formula

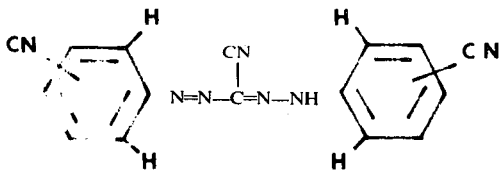

| | % Spray Conc. | Evaluation | | | |
|---|---|---|---|---|---|
| | | 1 Day | | 2 Days | |
| | | % Kill | Foliage Eaten | % Kill | % Foliage Eaten |
| Untreated | — | 0 | 100 | 0 | 100 |
| 1,5-bis(4-cyano-phenyl)-3-forma-zanecarbonitrile | .05 | 45 | 5 | 75 | 5 |
| | .025 | 15 | 7 | 70 | 8 |
| | .01 | 0 | 18 | 5 | 30 |
We claim:
1. A compound of the formula
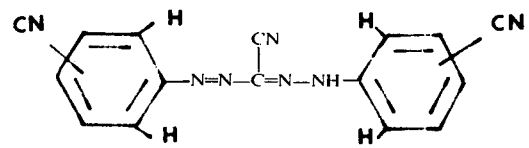
wherein each cyano substituent independently can be in the meta or para position of the respective phenyl moeties.
2. A compound of claim 1 wherein both cyano substituents are in the para position.
* * * * *